(12) United States Patent
Kiriyama et al.

(10) Patent No.: US 10,837,127 B2
(45) Date of Patent: Nov. 17, 2020

(54) CARBON FIBER BUNDLE AND METHOD OF PRODUCING CARBON FIBER BUNDLE

(71) Applicant: Mitsubishi Rayon Co., Ltd., Tokyo (JP)

(72) Inventors: Takayuki Kiriyama, Toyohashi (JP); Naoki Sugiura, Toyohashi (JP); Masahiro Hata, Toyohashi (JP)

(73) Assignee: Mitsubishi Chemical Corporation, Tokyo (JP)

( * ) Notice: Subject to any disclaimer, the term of this patent is extended or adjusted under 35 U.S.C. 154(b) by 764 days.

(21) Appl. No.: 14/395,250

(22) PCT Filed: Apr. 18, 2013

(86) PCT No.: PCT/JP2013/061536
§ 371 (c)(1),
(2) Date: Oct. 17, 2014

(87) PCT Pub. No.: WO2013/157613
PCT Pub. Date: Oct. 24, 2013

(65) Prior Publication Data
US 2015/0114262 A1    Apr. 30, 2015

(30) Foreign Application Priority Data

Apr. 18, 2012 (JP) .............................. 2012-094550

(51) Int. Cl.
| | | |
|---|---|---|
| *D01F 9/22* | (2006.01) | |
| *D01F 6/38* | (2006.01) | |
| *D01F 6/18* | (2006.01) | |
| *C08K 7/06* | (2006.01) | |

(52) U.S. Cl.
CPC ................. *D01F 9/22* (2013.01); *C08K 7/06* (2013.01); *D01F 6/18* (2013.01); *D01F 6/38* (2013.01); *D01F 9/225* (2013.01); *D10B 2101/12* (2013.01); *Y10T 428/2918* (2015.01)

(58) Field of Classification Search
CPC .............. D01F 9/22; D01F 9/225; C08K 7/06
USPC .................................................... 428/299.1
See application file for complete search history.

(56) References Cited

U.S. PATENT DOCUMENTS

| | | | |
|---|---|---|---|
| 4,347,279 A | 8/1982 | Saji et al. | |
| 5,037,590 A | 8/1991 | Fukushima | |
| 2001/0004491 A1 | 6/2001 | Manabe et al. | |
| 2007/0193246 A1 | 8/2007 | Schneider | |
| 2007/0196648 A1† | 8/2007 | Endo | |
| 2012/0088103 A1 | 4/2012 | Sugiura et al. | |
| 2012/0088104 A1 | 4/2012 | Hashimoto et al. | |
| 2013/0295811 A1 | 11/2013 | Shinmen et al. | |

FOREIGN PATENT DOCUMENTS

| | | |
|---|---|---|
| EP | 0303381 A1 | 2/1989 |
| EP | 0378187 A2 | 7/1990 |
| EP | 2620265 A1 | 7/2013 |
| JP | H03-014624 A | 1/1991 |
| JP | H03-014625 A | 1/1991 |
| JP | H09-031758 A | 2/1997 |
| JP | 2002-201569 A | 7/2002 |
| JP | 2004-300600 A | 10/2004 |
| JP | 2005-256211 A | 9/2005 |
| JP | 2008-509298 A | 3/2008 |
| JP | 2008-202207 A | 9/2008 |
| JP | 2009197358 A * | 9/2009 |
| JP | 2010-285710 A | 12/2010 |
| JP | 2011-046942 A | 3/2011 |
| KR | 10-2012-0023181 | 3/2012 |
| WO | 2006/018036 A1 | 2/2006 |
| WO | 2010/143681 A1 | 12/2010 |
| WO | 2012/039409 A1 | 3/2012 |
| WO | 2012/050171 A1 | 4/2012 |

OTHER PUBLICATIONS

Evolution of structure and properties of PAN precursors during their convesrion to carbon fibers. Zhang. Carbon. 2003.*
Machine translation of jp2009-197358.*
Soficar, "High-Performance Carbon Fiber, TORAYCA T620SC 24K 50C Delivery Specification", May 2011.
Germanischer Lloyd, "Statement of Approval" Dec. 14, 2009.
J. Yamazaki, "Certifiacte of Experimental Results", Nov. 2, 2015.
M. Endo "Certifiacte of Experimental Results", Oct. 9, 2015.
Third Party Observations against European Patent Application 13778729.7 dated Jan. 21, 2016.
Extended European Search Report issued in counterpart European Patent Application No. 13778729.7 dated Mar. 20, 2015.
Office Action issued in corresponding Korean patent application No. 2014-7029175 dated Aug. 24, 2015 (partial translation).
International Search Report issued in corresponding International Patent Application No. PCT/JP2013/061536 dated Jun. 18, 2013.
Written Opinion issued in corresponding International Patent Application No. PCT/JP2013/061536 dated Jun. 18, 2013.

\* cited by examiner
† cited by third party

*Primary Examiner* — Vincent Tatesure
(74) *Attorney, Agent, or Firm* — Morgan, Lewis & Bockius LLP

(57) ABSTRACT

Provided are carbon fiber bundles which have high knot strength even if the single fiber fineness is large, and which have excellent handling properties and processability. The carbon fiber bundles have a single fiber fineness of 0.8-2.5 dtex, knot strength of 298 N/mm² or greater. This method of producing carbon fibers having knot strength of 298 N/mm² or greater involves a heat treatment step for heat treating, for 50-150 minutes, specific polyacrylonitrile-based precursor fiber bundles described in the description in an oxidizing atmosphere rising in temperature in the temperature range of 220-300° C.

4 Claims, No Drawings

CARBON FIBER BUNDLE AND METHOD OF PRODUCING CARBON FIBER BUNDLE

TECHNICAL FIELD

The present invention relates to a carbon fiber bundle, production method thereof, as well as a composite material using carbon fiber bundles.

BACKGROUND ART

Methods of producing carbon fibers from polyacrylonitrile-based fibers with a polymer in which acrylonitrile is the main component as a raw material are widely known, and are produced by first flameproofing at 200 to 300° C. in air or another oxidizing gas atmosphere to make flameproof fibers, and then carbonizing this at 800 to 2,000° C. in an inert gas atmosphere such as nitrogen or argon. In addition, graphitization is further performed in an inert gas atmosphere of at least 2,000° C., and producing graphite fibers of much higher modulus of elasticity has been taking place.

The knot strength of carbon fiber bundles is one of the characteristics that is particularly greatly influenced by the structure of the carbon fibers. However, it has been known as not correlating with the tensile strength of carbon fiber bundles. For example, Patent Document 1 describes the knot strength of four types of carbon fibers that are commercially available, and collectively shows catalog data of strand tensile strengths of these carbon fibers in Table 1.

TABLE 1

| CF product class | Density g/cm$^3$ | Areal weight g/m | Strand strength MPa | Strand module of elasticity Gpa | Knot strength N/mm$^2$ |
|---|---|---|---|---|---|
| T300B-12K-50B | 1.76 | 0.8 | 3,530 | 230 | 270 |
| T700G-12K-31E | 1.8 | 0.8 | 4,900 | 240 | 750 |
| M30S-18K-50C | 1.73 | 0.75 | 5,490 | 294 | 720 |
| T800H-12K-40B | 1.81 | 0.44 | 5,490 | 294 | 280 |

As is evident from the above table, the knot strength is clearly shown as being a characteristic value irrespective of the strand strength and module of elasticity.

Furthermore, as described in Patent Document 2, using precursor fibers of different spinning conditions, the knot strength of carbon fiber bundles produced at the same calcination conditions have greatly different numerical values, even when the tensile strengths do not greatly differ. In addition, using the same precursor fiber bundles, the knot strength of the carbon fiber bundles obtained at different calcination conditions greatly differed as expected. This is a matter tracing back to the knot strength being a characteristic depending on the structure of the carbon fiber bundle, and the structure of the carbon fiber bundle is not only influenced by the structure of the precursor fibers, but while the structure greatly changes from the precursor fiber that is an organic fiber into a carbon fiber that is an inorganic fiber, differing structures being formed according to the flameproofing conditions during the calcination conditions is considered to be a cause. The flameproofing process is a reaction in which a reduction reaction of acrylonitrile polymer and oxidation reaction from oxygen and the decomposition gasification reaction of polymer, particularly copolymer components, occur due to heat, and thereamong, the oxidation reaction is a reaction requiring oxygen from the outer surface of a filament to diffuse to the inside, and thus becomes a reaction for which reaction unevenness tends to arise in the cross-sectional direction of a single fiber. In addition, this oxidation reaction is an exothermic reaction, and thus promotes the reduction reaction and decomposition reaction, a result of which structural unevenness tends to arise more in the cross-sectional direction. From the characteristics of this flameproofing process, although that having a high knot strength in the carbon fiber bundle having a single fiber fineness less than 0.8 dtex as shown in Table 1 are being industrialized, it becomes more difficult to produce carbon fibers having uniform structure as the fiber diameter of the precursor fiber increases, and further, in order to obtain high-performance carbon fibers, the necessity arises to drastically lengthen the treatment time in the flameproofing process, which has become a great hindrance from the viewpoint of lowering costs and a productivity improvement.

In addition, the structure of the precursor fiber is greatly influenced by the composition of the polyacrylonitrile-based polymer that is the raw material. Furthermore, in the case of using a modified polymer of a polyacrylonitrile-based polymer or a polymer that is not polyacrylonitrile based, the structure of the obtained carbon fiber will differ, and the knot strength will differ greatly as a result thereof. Patent Document 3 and Patent Document 4 describe the knot strength of pitch carbon fibers. Furthermore, it is mentioned that pitch carbon fibers have considerably low knot strength compared to acrylonitrile-based carbon fibers, and as a countermeasure thereof, the object is described of modification of the raw material pitch being carried out. A list made by collecting the values actually disclosed after unit conversion is shown in Table 2.

TABLE 2

| Carbon fiber | Diameter μm | Strand strength MPa | Strand module of elasticity GPa | Knot strength gf/3k | Knot strength N/mm$^2$ |
|---|---|---|---|---|---|
| Japanese Unexamined Patent Application, Publication H03-14625 (1500° C. carbonization treatment) | 8.2 7.4 7.5 | 2793 3577 3753 | 227 250 211 | 220 900 3100 | 14 69 230 |
| Japanese Unexamined Patent Application, Publication H03-14624 (1550° C. carbonization treatment) | 10 | 3724 | 245 | 4600 | 192 |
| HM-60 | 10 | 2940 | 588 | 54 | 2 |
| P25W | 11 | 1343 | 154 | 1100 | 38 |
| P55S | 11 | 1666 | 372 | 123 | 4 |

In this way, the knot strength is a characteristic that is greatly influenced by the structure of carbon fibers, and is considered to be greatly dependent on the raw material of the precursor fiber, production conditions, and further the conditions of the calcination process.

With the object of efficiently producing and providing high-quality, high-performance carbon fibers, Patent Document 5 proposes a carbon fiber having a strand strength of at least 389 kgf/mm$^2$, made by calcining a polyacrylonitrile-based precursor fiber bundle constituted from a copolymer made by copolymerizing 1 to 10% of a specific polymerizable unsaturated carboxylic acid alkyl ester and 0.25 to 5% of a specific polymerizable unsaturated carboxylic acid, and having a single thread inner/outer oxygen concentration ratio obtained by secondary ion mass spectrometry (SIMS) of no more than 6, or H/C of the inner layer of no more than 0.03, after flameproofing for 5 minutes at 260° C., further for 5 minutes at 280° C. in air at ambient pressure. The Examples propose carbon fiber bundles having a strand strength of 501 kgf/mm$^2$ and strand modulus of elasticity of 26 tonf/mm$^2$ with carbon fibers from flameproofing, using a 2.0 denier polyacrylonitrile-based precursor fiber bundle produced from a copolymer made from 92.5% acrylonitrile, 1.5% itaconic acid and 6% normal butyl methacrylate, these fibers for 30 minutes in air at 240 to 260° C., and heat treating in a nitrogen flow at up to 1,300° C. This succeeds at the production of carbon fibers having relatively high tensile strength with a flameproofing time of a short time, even with fibers having large relative fineness of single fibers, by causing the flameproofing reactivity to decline by drastically lowering the acrylonitrile ratio.

Patent Document 6 proposed technology for efficiently producing thick fineness carbon fiber bundles by spinning flameproof polymer with polyacrylonitrile-based polymer as a precursor to obtain a flame proof fiber bundle such that the single fiber fineness is at least 2 dtex, and then carbonization treating this flameproof fiber bundle.

Patent Document 7 describes a production method of flameproof fibers that heat treats to flameproof polyacrylonitrile-based precursor fibers in a liquid containing solvent A, a specific organic nucleophilic reagent B and an organic nitrogen compound C having an oxidizing function on the polyacrylonitrile-based precursor fiber.

Patent Document 1: Japanese Unexamined Patent Application, Publication No. 2002-201569
Patent Document 2: Japanese Unexamined Patent Application, Publication No. 2010-285710
Patent Document 3: Japanese Unexamined Patent Application, Publication No. H03-14624
Patent Document 4: Japanese Unexamined Patent Application, Publication No. H03-14625
Patent Document 5: Japanese Unexamined Patent Application, Publication No. H09-31758
Patent Document 6: Japanese Unexamined Patent Application, Publication No. 2008-202207
Patent Document 7: Japanese Unexamined Patent Application, Publication No. 2004-300600

DISCLOSURE OF THE INVENTION

Problems to be Solved by the Invention

However, with Patent Document 5, since the polyacrylonitrile ratio is low at 92.5%, ladder structure formation in the flameproofing treatment is not sufficient, and decomposition and gasification occurs in the carbonizing treatment to inhibit the formation of a compact structure of carbon fibers. Furthermore, since the flameproofing treatment time to be short at 10 minutes, this reaction of decomposition and gasification occurs suddenly; therefore, more unevenness in the degree of fineness arises. As a result thereof, it has come to be very difficult to produce carbon fibers having sufficient knot strength.

In addition, the structure of flameproof fibers that are precursor fibers obtained by spinning a flameproof polymer disclosed in Patent Document 6 do not have a compact structure compared to flameproof fibers subjected to flameproofing treatment after spinning of polyacrylonitrile-based polymer, and thus are relatively close to pitch precursor fibers. As a result thereof, the knot strength of the obtained carbon fibers is low.

Furthermore, for the method disclosed in Patent Document 7, upon the present inventors performing supplementary examination, only flameproof fibers of low strength could be obtained. In addition, since heat treatment is performed in high-temperature liquid, there is a problem also in safety, and in the case of producing continuously, the facility will become very large due to the flameproofing time, or productivity must decline, and thus is not suited to industrialization. In addition, in the case of performing batch treatment in a state wound on a bobbin, unevenness in flameproofing occurs between the inner/outer layers of the bobbin, and the knot strength of the obtained carbon fiber becomes low.

In addition, as a means for increasing the production output in the field of composite fibers, a method has been known of thickening fiber bundle by increasing the number of single fibers or thickening the thickness of each single fiber, and thus increasing the discharge amount per spinneret. If thickening the fiber bundle in this way, the production output will increase, while due to being related with a cost reduction at the same time due to an increase in cost of equipment being curbed to a minimum, it has been widely used in major industrial fibers such as polyester and nylons (refer to Patent Document 6).

However, in the process of calcining using a precursor with acrylonitrile as a main component, increasing the single fiber fineness inhibits the penetration to the inside of the single fiber of oxygen that is necessary in reaction; therefore, it is very difficult for structural formation to be accomplished, and achieving both mechanical strength expressability of the carbon fiber and thick single fiber fineness has been said to be difficult. Furthermore, technology that obtains carbon fiber having a large fiber diameter and high knot strength at low cost has thus far not been achieved. For this reason, it has not been possible to commercially provide carbon fiber of large fiber diameter that can endure handling by a process of impregnating the carbon fiber with resin, molding process, or the like.

The present invention has an object of providing carbon fiber bundles having high knot strength even when the single fiber fineness is large, and excelling in handling properties and processability. In addition, the present invention has an object of providing a composite material using such carbon fiber bundles.

Means for Solving the Problems

The problems are solved by the following first to ninth aspects of the present invention.

According to a first aspect of the present invention, a carbon fiber bundle has a single fiber fineness of at least 0.8 dtex to no more than 2.5 dtex, and a knot strength of at least 298 N/mm$^2$.

According to a second aspect of the present invention, in the carbon fiber bundle as described in the first aspect, the knot strength of the carbon fiber bundle is at least 345 N/mm$^2$.

According to a third aspect of the present invention, in the carbon fiber bundle as described in the first aspect, the single fiber fineness of the carbon fiber bundle is at least 1.2 dtex to no more than 1.6 dtex, and the knot strength is at least 380 N/mm$^2$.

According to a fourth aspect of the present invention, in the carbon fiber bundle as described in any one of the first to third aspects, a number of single fibers is at least 6,000 to no more than 50,000.

According to a fifth aspect of the present invention, in the carbon fiber bundle as described in the fourth aspect, the number of single fibers is at least 23,000 to no more than 38,000.

According to a sixth aspect of the present invention, a method of producing carbon fiber bundles having a knot strength of at least 298 N/mm², includes a heat treatment step of heat treating, for at least 50 minutes to no more than 150 minutes under an oxidizing atmosphere rising in temperature within the temperature range of 220 to 300° C., a polyacrylonitrile-based precursor fiber bundle having a single fiber fineness of at least 1.7 dtex to no more than 5.0 dtex consisting of a polyacrylonitrile-based copolymer of 96 to 99% by mole of acrylonitrile units and 1 to 4% by mole of hydroxyalkyl methacrylate units, and/or a polyacrylonitrile-based precursor fiber bundle having a single fiber fineness of at least 1.7 dtex to no more than 5.0 dtex having a constant velocity temperature rising exothermic curve of 30° C. to 450° C. measured in an air flow of 100 ml/min that is a flowrate based on 30° C. at 0.10 MPa and at a heating rate of 10° C./min using a heat flux-type differential scanning calorimeter that satisfies conditions (A) and (B) below:
(A) heat amount Ja obtained by integrating the heat generation rate of at least 230° C. to no higher than 260° C. of a constant velocity temperature rising exothermic curve is at least 140 kJ/kg to no more than 200 kJ/kg; and
(B) heat amount Jb obtained by integrating the heat generation rate of at least 260° C. to no higher than 290° C. is at least 600 kJ/kg to no more than 1,000 kJ/kg.

According to a seventh aspect of the present invention, in the method of producing carbon fiber bundles as described in the sixth aspect, a heat treatment time T1 in the heat treatment step satisfies condition (C) below:
(C) 45× single fiber fineness (dtex) of polyacrylonitrile-based precursor fiber bundle≥heat treatment time T1 (minutes)≥45× single fiber fineness (dtex) of polyacrylonitrile-based precursor fiber bundle−60.

According to an eighth aspect of the present invention, in the method of producing carbon fiber bundles as described in the seventh aspect, an elongation rate of the polyacrylonitrile-based precursor fiber bundle is at least −5% to no more than 5% in the heat treatment step.

According to a ninth aspect of the present invention, a resin-based composite material contains the carbon fiber bundle as described in any one of the first to fifth aspects.

Effects of the Invention

According to the present invention, carbon fiber bundles are provided having high knot strength even when the single fiber fineness is large, and excelling in handling properties and processability. In addition, according to the present invention, a composite material using such a carbon fiber bundle is provided.

PREFERRED MODE FOR CARRYING OUT THE INVENTION

According to an aspect of the present invention, a carbon fiber bundle is provided in which the single fiber fineness of the carbon fiber bundle is at least 0.8 dtex to no more than 2.5 dtex, and the knot strength is at least 298 N/mm².

According to another aspect of the present invention, a method of producing carbon fiber bundles having a knot strength of at least 298 N/mm² is provided that includes a heat treatment process (flameproofing process) of heat treating an acrylonitrile-based precursor fiber bundle for at least 50 minutes to no more than 150 minutes under an oxidizing atmosphere that rises in temperature within the temperature range of 220 to 300° C. This production method is suitable in order to produce the above-mentioned carbon fiber bundles. Herein, as the polyacrylonitrile-based precursor fiber bundle, one type or a plurality of types of polyacrylonitrile-based precursor fiber bundles selected from the group consisting of the polyacrylonitrile-based precursor fiber bundle of i) and the polyacrylonitrile-based precursor fiber bundle of ii) shown below can be used. A certain type of precursor fiber bundle may fall under both i) and ii), or may fall under only one of either i) and ii).

i) Polyacrylonitrile-based precursor fiber bundle consisting of a polyacrylonitrile-based copolymer of at least 96% by mole to no more than 99% by mole of acrylonitrile units and at least 1% by mole to no more than 4% by mole of hydroxyalkyl methacrylate units. However, the single fiber fineness thereof is at least 1.7 dtex to no more than 5.0 dtex.

ii) Polyacrylonitrile-based precursor fiber bundle for which the constant velocity temperature rising exothermic curve of 30° C. to 450° C. measured in an air flow of 100 ml/min (flowrate basis of 30° C., 0.10 MPa) and heating rate of 10° C./min using a heat flux-type differential scanning calorimeter, satisfies both of the following conditions (A) and (B). However, the single fiber fineness thereof is at least 1.7 dtex to no more than 5.0 dtex:
(A) heat amount Ja obtained by integrating the heat generation rate of at least 230° C. to no higher than 260° C. of a constant velocity temperature rising exothermic curve is at least 140 kJ/kg to no more than 200 kJ/kg; and
(B) heat amount Jb obtained by integrating the heat generation rate of at least 260° C. to no higher than 290° C. is at least 600 kJ/kg to no more than 1,000 kJ/kg.

In relation to the present invention, "polyacrylonitrile-based precursor fiber bundle" is a fiber bundle for carbon fiber consisting of a copolymer in which acrylonitrile is a main component. The ratio of acrylonitrile units among the monomer units constituting this polymer, for example, is set to at least 94% by mole, and further, to at least 96% by mole. Hereinafter, the present invention will be explained in detail.

As the polyacrylonitrile-based polymer that can be used as the raw material of the polyacrylonitrile-based precursor fiber bundle that is the raw material of the carbon fiber bundle of the present invention, there are polyacrylonitrile homopolymers or copolymers, or mixtures thereof.

As the polyacrylonitrile-based polymer, it is preferably one for which the flameproofing reaction advances quickly to the inside, and when established as a polyacrylonitrile-single copolymer copolymerizing hydroxyalkyl methacrylate units (copolymer of acrylonitrile units and only one type of monomer other than acrylonitrile units), or as a polyacrylonitrile-based precursor fiber bundle, a polyacrylonitrile-based copolymer is preferable having a constant velocity temperature rising exothermic curve of 30° C. to 450° C. that satisfies the following conditions (A) and (B) when measured in an air flow of 100 ml/min based on 30° C. and 0.10 MPa and heating rate of 10° C./min using a heat flux-type differential scanning calorimeter.
(A) heat amount Ja obtained by integrating the heat generation rate of at least 230° C. to no higher than 260° C. of a constant velocity temperature rising exothermic curve is at least 140 kJ/kg to no more than 200 kJ/kg; and (B) heat amount Jb obtained by integrating the heat generation rate of at least 260° C. to no higher than 290° C. is at least 600 kJ/kg to no more than 1,000 kJ/kg.

The content of hydroxyalkyl methacrylate units in the polyacrylonitrile-based copolymer is preferably 1 to 4% by mole. The carboxylate ester group of the hydroxyalkyl methacrylate units becomes a carboxylic acid group by thermally decomposing at high temperatures of 250° C. or higher. If the content of hydroxyalkyl methacrylate units in the copolymer is at least 1% by mole, a sufficient effect of promoting the flameproofing reaction will be easily obtained upon the carboxylate acid ester group of the hydroxyalkyl methacrylate unit becoming a carboxylic acid group in the flameproofing process. On the other hand, if no more than 4% by mole, it is easily possible to suppress runaway of the flameproofing reaction. Furthermore, suppressing a decline in the carbonization yield accompanying the detachment of the hydroxyalkyl group in the flameproofing process is easy.

The lower limit for the content of the hydroxyalkyl methacrylate units is preferably at least 1.2% by mole from the viewpoint of compactness securement of the polyacrylonitrile-based precursor fiber bundle (hereinafter referred to as "precursor fiber bundle" as appropriate), and is more preferably at least 1.5% by mole in the point of higher performance carbon fiber being obtained. In addition, the upper limit for the content of hydroxyalkyl methacrylate units is preferably no more than 4.0% by mole from the aspect of suppressing runaway reaction in the flameproofing process, and is more preferably no more than 3.0% by mole in the aspect of suppress a decline in the carbonization yield.

As the hydroxyalkyl methacrylate serving as the raw material of the hydroxyalkyl methacrylate units, 2-hydroxyethyl methacrylate, 2-hydroxypropyl methacrylate, 4-hydroxybutyl methacrylate, monoglyceryl methacrylate and tetrahydrofurfuryl methacrylate can be exemplified. Furthermore, these hydroxyalkyl methacrylates may be jointly used.

2-Hydroxyethyl methacrylate is suitable as a constituent element of the copolymer used in the present invention in the aspects of the detachment temperature of the hydroxyethyl group in the flameproofing process being at least 240° C., having sufficient bulk in the improvement of oxygen permeability, the decrease in mass when the hydroxyethyl group detaches being small, being easily obtained industrially, etc.

The polyacrylonitrile-based copolymer preferably contains acrylonitrile units and hydroxyalkyl methacrylate units; however, it may contain other monomer units as necessary. Alternatively, the polyacrylonitrile-based copolymer may consist of acrylonitrile units and hydroxyalkyl methacrylate units. In place of the hydroxyalkyl methacrylate units, for example, it is possible to use hydroxyalkyl acrylate units.

As the other monomer, a vinyl-based monomer that can copolymerize with acrylonitrile is preferable. More specifically, ester (meth)acrylates such as methyl (meth)acrylate, ethyl (meth)acrylate, propyl (meth)acrylate, butyl (meth) acrylate and hexyl (meth)acrylate; halogenated vinyls such as vinyl chloride, vinyl bromide and vinylidene chloride; acids such as (meth)acrylic acid, itaconic acid and crotonic acid and salts of these; maleic acid imide, phenylmaleimide, (meth) acrylamide, styrene, α-methylstyrene, vinyl acetate, etc. can be exemplified. These may be used individually, or two or more types may be jointly used.

The content of the other monomer in the polyacrylonitrile-based copolymer is preferably no more than 3.0% by mole considering the contents of acrylonitrile units and hydroxyalkyl methacrylate units.

As a polymerization method for obtaining a polyacrylonitrile-based polymer that can be used as a raw material of the polyacrylonitrile-based precursor fiber bundle that is the raw material of the carbon fiber bundle of the present invention, although redox polymerization in an aqueous solution, suspension polymerization in a heterogeneous system, emulsion polymerization using a dispersant, etc. can be exemplified, for example, it is not limited thereto.

In general, the polyacrylonitrile-based precursor fiber bundle for carbon fiber bundles is produced by obtaining a coagulated thread by discharging a spinning dope of 15 to 30% by mass polymer concentration obtained by dissolving polyacrylonitrile-based polymer in a solvent into a coagulation bath at a temperature of 20 to 50° C. consisting of an aqueous solution of 30 to 70% by mass solvent concentration, then drawing this coagulated thread. Hereinafter, the spinning method is explained.

<Preparation of Spinning Dope>

The aforementioned polymer is dissolved by a conventional method into a solvent, and defined as a spinning dope. As the solvent, organic solvents such as dimethylacetamide, dimethylsulfoxide and dimethylformamide, and aqueous solutions of inorganic compounds such as zinc chloride and sodium thiocyanic acid can be used. An organic solvent is preferable from the aspects of not containing metals in the precursor fiber bundle and the process being simplified, and thereamong, it is preferable to use dimethylacetamide in the aspect of the compactness of the precursor fiber bundle being high.

<Coagulation>

The spinning dope preferably has a polymer concentration of at least a certain extent in order to obtain a compact coagulated thread, and so as to have suitable viscosity and fluidity. The concentration of polymer in the spinning dope is preferably in the range of 15 to 30% by mass, and is more preferably in the range of 18 to 25% by mass. As the coagulation bath liquid, an aqueous solution of the same solvent as a general spinning dope is used. In this case, water functions as a poor solvent of the polymer.

As the spinning method of the acrylonitrile-based precursor fiber bundle of the carbon fiber bundle obtained in the present invention, a conventional method can be adopted, and more specifically, a wet spinning method, wet-dry spinning method, dry spinning method, etc. can be exemplified. Thereamong, a wet spinning method is preferably used from the viewpoint of productivity.

A coagulated thread can be obtained by discharging the above-mentioned spinning dope into a coagulation bath via a spinneret and spinning. The coagulation bath conditions are important to obtain a compact structure required in the precursor fiber for carbon fibers and in order to ensure the coagulability to enable high productivity. As the coagulation bath conditions, a solvent concentration of at least 30% by mass to no more than 70% by mass, and a temperature of at least 20° C. to no higher than 50° C. are preferable. If the coagulation bath conditions are within these ranges, it will be possible to obtain a compact precursor fiber bundle while keeping a suitable coagulation rate. In addition, the roundness of a single fiber of the precursor fiber bundle described later can be controlled in the coagulation process of the spinning process.

If the solvent concentration in the coagulation bath is no more than 70% by mass, the exchange velocity between the solvent and water at the surface of the spinning dope discharged into the coagulation bath surpasses the diffusion rate of water into the spinning dope, and compact precursor fibers can be easily obtained, and further, the adherence between single threads in the precursor fiber bundle can be easily suppressed. In particular, upon spinning the precursor fiber bundle for which the single fiber fineness and total fineness are both large, the concentration is preferably no more than 67% by mass from the aspect of further suppressing adherence between single threads. In addition, if the coagulation bath solvent concentration is at least 30% by mass, it is possible to easily suppress the exchange velocity between the solvent and water at the surface of the spinning dope discharged into the coagulation bath from considerably surpassing the diffusion rate of water into the spinning dope, and a compact precursor fiber bundle can be easily obtained in a range in which sudden shrinkage of the coagulated thread does not occur. The cross-sectional shape of the precursor fiber bundle varies depending on the coagulation bath conditions. If the concentration is in the range from 30% by weight to 70% by weight, the roundness showing the cross-sectional shape is easily kept within a favorable range for the performance expression and resin impregnation property of the carbon fiber.

On the other hand, if the coagulation bath temperature is no higher than 50° C., it is possible to easily suppress the exchange velocity between solvent and water at the surface of the spinning dope discharged into the coagulation bath from considerably surpassing the dispersion rate of water into the spinning dope, and a compact precursor fiber can be easily obtained in a range in which sudden shrinkage of the coagulated thread does not occur. In addition, if at least 20° C., the exchange velocity between the solvent and water at the surface of the spinning dope discharged into the coagulation bath and the dispersion rate of water into the spinning dope will be kept suitable, and stably producing precursor fiber bundles will become easy. Furthermore, it is not necessary to excessively cool the coagulation bath, and thus the capital investment and running cost can be suppressed, and it becomes possible to produce precursor fiber bundles at low cost. The coagulation bath temperature is preferably at least 25° C., and is more preferably at least 35° C. In addition, the coagulation bath temperature is preferably no higher than 45° C.

The single fiber fineness of the polyacrylonitrile-based precursor fiber bundle of the present invention is preferably at least 1.7 dtex to no more than 5.0 dtex. If at least 1.7 dtex, producing a carbon fiber bundle of the objective knot strength productively will be easy. On the other hand, if the single fiber fineness of the precursor fiber bundle is no more than 5.0 dtex, carbon fiber bundles of uniform quality can be produced easily and stably without the cross-sectional two-layer structure becoming obvious in the flameproofing process. The single fiber fineness of the precursor fiber bundle is preferably at least 1.8 dtex, and more preferably at least 2.4 dtex. In addition, the single fiber fineness is preferably no more than 4.0 dtex, and more preferably no more than 3.2 dtex.

In the production method of the present invention, by setting the single fiber fineness of the polyacrylonitrile-based precursor fiber bundle to at least 1.7 dtex to no more than 5.0 dtex, it is possible to obtain a carbon fiber bundle having a single fiber fineness of at least 0.8 dtex to no more than 2.5 dtex.

In the present invention, the carbon fiber precursor fiber bundle and carbon fiber bundle preferably are at least 6,000 to no more than 50,000 fibers. If the carbon fiber bundle is no more than 50,000 fibers, in the structure in the cross-sectional direction of a single fiber produced in the calcination process, the non-uniformity between single fibers will tend to decrease, and sufficient mechanical performance will tend to be obtained. In addition, if at least 6,000 fibers, productivity will tend to be ensured. The number of fibers in the carbon fiber bundle is preferably at least 12,000 to no more than 36,000, and is more preferably at least 23,000 to no more than 38,000. In addition, in a case of the single fiber fineness of the polyacrylonitrile-based precursor fiber bundle exceeding 3.1 dtex, not exceeding 110,000 dtex as a total fineness is preferable in the aspect of decreasing the structural non-uniformity in the cross-sectional direction between single fibers.

Next, the production method of carbon fibers of the present invention will be explained. First, the polyacrylonitrile-based precursor fiber bundle is flameproofing treated at a temperature of at least 220° C. to no higher than 300° C. under an oxidizing atmosphere to make a flameproof fiber bundle. It should be noted that, in the present invention, "under an oxidizing atmosphere" indicates in air containing oxidizing substances such as nitrogen dioxide, sulfur dioxide and oxygen.

The flameproofing treatment time is preferably 50 to 150 minutes. If the flameproofing treatment time is at least 50 minutes, it is easy to sufficiently carry out diffusion of oxygen to inside of a single fiber constituting the precursor fiber bundle. It is more preferably at least 70 minutes from the aspect of diffusion of oxygen. In addition, if the flameproofing treatment time is no more than 150 minutes, producing carbon fiber bundles efficiently will be easy, without the flameproofing treatment process in the production process of carbon fiber bundles becoming a cause harming the productivity. The flameproofing time is preferably no more than 130 minutes, and more preferably no more than 100 minutes.

Furthermore, due to being influenced by the fineness of the polyacrylonitrile-based precursor fiber bundle, it is preferable for the flameproofing time to be a heat treatment time T1 satisfying condition (C) below, in order to allow oxygen to diffuse to the inside of single fibers to perform flameproofing to the inside of single fibers, and raise the knot strength:

(c) 45× single fiber fineness (dtex) of polyacrylonitrile precursor fiber≥heat treatment time T1 (minutes)≥45× single fiber fineness (dtex) of polyacrylonitrile precursor fiber−60.

With the present invention, in the course from the start of the flameproofing treatment until the flameproofing treatment ends, if the elongation rate of the polyacrylonitrile-based fiber is at least −5% to no more than 5%, sufficient strength tends to be realized without the grade of carbon fiber, particularly the strand strength, declining. In addition, if the elongation rate at this time is at least −5% to no more than 5%, it is easy to perform production of flameproof fibers stably without thread breakage, etc. occurring. When the fineness is thick, the elongation rate is preferably at least 0%, and more preferably at least 3%, from the viewpoint of knot strength expressability.

The density of the flameproof fiber bundle obtained by the flameproofing treatment is preferably 1.34 to 1.43 g/cm$^3$. If at least 1.34 g/cm$^3$, it is easy to produce carbon fiber without the yield of carbon fiber bundles declining. In general, although the yield of carbon fiber bundles increases as the density of flameproof fibers rises, the performance of the carbon fiber is known to decline, and if the density of flameproof fiber bundles is no more than 1.43 g/cm$^3$, the performance decline of the carbon fiber is suppressed, and it is easy to increase the yield of obtained carbon fiber bundles. From the viewpoint of performance maintenance and yield increase of the obtained carbon fibers, the density of flameproof fiber bundles is more preferably 1.34 to 1.38 g/cm$^3$.

In the segment receiving flameproofing treatment, when the rate at which fibers are introduced to this segment is defined as A, and the rate at which fibers subjected to flameproofing treatment are lead out from this segment defined as B, the elongation rate is calculated by formula (1) below:

$$\text{Elongation rate (\%)} = (A-B)/A \times 100 \qquad \text{Formula (1)}.$$

<Heat Amounts Ja, Jb of Constant Velocity Temperature Rising Exothermic Curve>

In the present invention, the polyacrylonitrile-based precursor fiber bundle preferably has a constant velocity temperature rising exothermic curve of 30° C. to 450° C. that satisfies the following conditions when measured in an air flow of 100 ml/min (basis: 30° C., 0.10 MPa) and heating rate of 10° C./min using a heat flux-type differential scanning calorimeter.

(Conditions):
(A) heat amount Ja obtained by integrating the heat generation rate of at least 230° C. to no higher than 260° C. of a constant velocity temperature rising exothermic curve is at least 140 kJ/kg to no more than 200 kJ/kg; and
(B) heat amount Jb obtained by integrating the heat generation rate of at least 260° C. to no higher than 290° C. is at least 600 kJ/kg to no more than 1,000 kJ/kg. The aforementioned constant velocity temperature rising exothermic curve shows the heat amount generating when the flameproofing reaction advances in the precursor fiber bundle.

It should be noted that, upon producing carbon fiber, in the flameproofing process obtaining flameproof fiber bundles from the precursor fiber bundle, the initial treatment temperature thereof is set within the range of a temperature of at least the temperature at which the flameproofing reaction is initiated, and a temperature no higher than the temperature at which the precursor fiber bundle melts. On the other hand, so long as the flameproofing reaction progresses to a certain extent, it is possible to set to a higher treatment temperature in order to efficiently perform flameproofing treatment. In general, since the precursor fiber bundle is flameproofing treated in the temperature region from 220° C. to 300° C., the present inventors, etc. divided this temperature region around 260° C. into the two temperature regions of a flameproofing process first half and a flameproofing process second half, defining the heat generation of 230° C. to 260° C. as heat amount Ja and defining the heat generation of 260° C. to 290° C. as heat amount Jb, and compared the quality and performance of carbon fiber bundles ultimately obtained between the heat generations of the respective temperature regions.

As a result thereof, in the case of the heat amount Ja and heat amount Jb being in the above-mentioned ranges, it was found that the flameproofing reaction and oxygen diffusion was carried out with good balance, the cross-sectional two-layered structure of flameproof fibers in the high-speed flameproofing treatment was suppressed, carbon fiber bundles of high quality and favorable performance expressability were efficiently obtained, and a precursor fiber bundle having large single fiber fineness could be uniformly flameproofing treated. It should be noted that, regarding the flameproofing treatment temperature upon producing actual carbon fiber bundles, due to being influenced by the equipment used and treatment time, the temperature setting during the flameproofing treatment raises the temperature to within the range of 220 to 300° C., and should be an optimum temperature setting in order to flameproofing treat the precursor fiber.

In other words, if a polyacrylonitrile precursor fiber having a heat amount Ja of at least 140 kJ/kg, the flameproofing reaction moderately progresses in the flameproofing process first half, and the precursor fiber bundle tends to pass through the process without melting by the heat. In addition, if a polyacrylonitrile precursor fiber having Ja of no more than 200 kJ/kg, in the flameproofing process first half, even a precursor fiber bundle of large single fiber fineness tends to be uniformly flameproofing treated without the flameproofing reaction progressing right away. The heat amount Ja is more preferably at least 150 kJ/kg from the viewpoint of productivity, while it is more preferably no more than 190 kJ/kg from the viewpoint of more uniformly flameproofing treating precursor fiber bundles of large single fiber fineness, and particularly preferably no more than 180 kJ/kg.

On the other hand, if polyacrylonitrile precursor fibers having a heat amount Jb of at least 600 kJ/kg, the precursor fiber bundle tends to be flameproofing treated to the target density of the flameproof fibers without harming the productivity in the flameproofing process. In addition, if polyacrylonitrile precursor fibers of no more than 1,000 kJ/kg, since the flameproofing reaction will slowly progress in the flameproofing process, a precursor fiber bundle of large single fiber fineness will tend to be uniformly flameproof treated, and the formation of cross-sectional two-layered structure will tend to be suppressed. The heat amount Jb is preferably at least 620 kJ/kg from the viewpoint of a productivity improvement, and is more preferably at least 640 kJ/kg from the viewpoint of a further productivity improvement. In addition, it is preferably no more than 900 kJ/kg from the viewpoint of more uniformly flameproofing treating precursor fiber bundles of large single fiber fineness.

In view of the above, it was found that the heat amount Ja can be set as an index of the flameproofing reactivity in the flameproofing process first half, and the heat amount Jb can be set as an index of the flameproofing reactivity in the flameproofing process second half. It should be noted that the heat amount Ja and heat amount Jb can consistently be set as indices of the flameproofing reactivity of precursor fiber bundles, and the treatment temperature region adopted in the actual flameproofing process may or may not include the temperature region of the heat amount Ja or heat amount Jb (i.e. 230 to 260° C. or 260 to 290° C.), and can be appropriately adjusted in the range of 220 to 300° C. depending on the precursor fiber bundle used, equipment used, and treatment time.

In addition, a flameproof thread having the heat amount Ja obtained by integrating the heat generation rate of 230° C. to 260° C. on the constant velocity temperature rising exothermic curve of at least 140 kJ/kg to no more than 200 kJ/kg and a heat amount Jb obtained by integrating the heat generation rate of 260° C. to 290° C. of at least 600 kJ/kg to no more than 1,000 kJ/kg has little internal-external structural difference, and when calcining this flameproof thread, a homogeneous carbon fiber is easily obtained as a single fiber. The homogeneous carbon fiber is considered to have high strength against stress producing strain from every direction. Regarding this strength to a complex stress field from all directions, the carbon fiber bundle can be evaluated from the tensile fracture stress of the knotted part, and a carbon fiber having a knot strength of at least 298 N/mm² can be produced. Furthermore, the physical property decline can be reduced when increasing the single fiber fineness if satisfying these conditions.

A carbon fiber bundle can be obtained by carbonizing the fiber bundle obtained from the flameproofing process. After the flameproofing treatment and before the carbonization treatment, it is possible to perform a pre-carbonization treatment that treats the flameproof fiber bundle obtained at a highest temperature that is a temperature of at least 550° C. to no higher than 800° C. in inert gas.

A carbon fiber bundle can be produced by carbonization treating the obtained flameproof fiber bundle at a temperature of at least 800° C. to no higher than 2,000° C. in inert gas. Furthermore, graphite fiber can be produced by treating this carbon fiber at a temperature on the order of at least 2,500° C. to no higher than 2,800° C. in inert gas. Setting of the temperature sets according to the desired mechanical properties of the carbon fiber. In order to obtain carbon fiber having high strength, it is better for the highest temperature of carbonization treatment to be low, and since the modulus of elasticity can be raised by lengthening the treatment time, it is possible to lower the highest temperature as a result thereof. Furthermore, by lengthening the treatment time, it becomes possible to gently set the temperature gradient, and there is an effect of suppressing defective spot formation. Although dependent on the temperature setting of the carbonization furnace, the carbonization furnace should be at least 1,000° C. It is preferably at least 1050° C. Although there is no particular limitation for the temperature gradient, a linear gradient is preferably set.

In the case of manufacturing a composite material using the carbon fiber bundles of the present invention, a surface treatment may be performed prior to the sizing treatment process. For example, it is preferable to improve the affinity and adhesiveness between the carbon fibers and matrix resin of the composite material by conducting an electrolytic oxidation treatment in electrolyte, or conducting oxidation treatment in the gas phase of liquid phase.

As the main component of the sizing agent in the sizing treatment liquid, an epoxy resin, epoxy-modified polyurethane resin, polyester resin, phenol resin, polyamide resin, polyurethane resin, polycarbonate resin, polyetherimide resin, polyamideimide resin, polyimide resin, bismaleimide resin, urethane-modified epoxy resin, polyvinyl alcohol resin, polyvinylpyrrolidone resin, polyethersulfone resin, etc. can be exemplified, and is not particularly limited.

The content of sizing agent in the sizing treatment liquid is not particularly limited, and 0.2 to 20% by mass is preferable, and 3 to 10% by mass is more preferable. By setting the content of sizing agent in the sizing treatment liquid to at least 0.2% by mass, it is easy to sufficiently impart the desired function to the carbon fiber. In addition, by setting the content of the sizing agent in the sizing treatment liquid to no more than 20% by mass, the coating amount of the sizing agent becomes preferable, and the impregnating ability of the matrix resin into the carbon fiber bundle upon producing the processed composite material easily becomes favorable.

Although the solvent or dispersing medium used in the sizing treatment liquid is not particularly limited, it is preferable to use water from the aspect of handling characteristics and stability.

The coating amount of the sizing agent relative to 100% by mass of the carbon fiber bundle is preferably 0.3 to 5% by mass, and more preferably 0.4 to 3% by mass. By setting the coating amount of the sizing agent to at least 0.3% by weight, it becomes easy to sufficiently impart the desired function to the carbon fiber bundle. In addition, by setting the coating amount of the sizing agent to no more than 3% by mass, the impregnation ability of the matrix resin into the carbon fiber bundle upon manufacturing a composite material, which is a subsequent process, easily becomes favorable.

In the drying treatment after the sizing treatment, the solvent or dispersing medium of the sizing treatment liquid is removed by drying. For the conditions at this time, the range of temperature of 120 to 300° C. and 10 seconds to 10 minutes is suitable, and the range of temperature of 150 to 250° C. and 30 seconds to 4 minutes is more suitable. By setting the drying temperature to at least 120° C., the solvent can be sufficiently removed easily. In addition, by setting the drying temperature to no higher than 300° C., the quality of the sizing treated carbon fiber bundle can be easily maintained.

The method of the drying treatment is not particularly limited and, for example, a method of drying by contacting the carbon fiber bundle with a hot roller with steam as the heat source, and a method of drying the carbon fiber bundle in an apparatus in which hot air circulates can be exemplified.

The carbon fiber bundle of the present invention preferably has a single fiber fineness of 0.8 to 2.5 dtex. If the average single fiber fineness is in the range of 0.8 to 2.5 dtex, the flexural rigidity of each one of the single fibers constituting the carbon fiber bundle rises and, even when made a carbon fiber bundle, makes a high flexural rigidity carbon fiber bundle. In addition, it is preferable since the problem of the oxygen permeability declining and the problem of the defect existence probability increasing and strength of carbon fiber declining do not occur.

Furthermore, in the present invention, it is important for the knot strength, arrived at by dividing tensile facture load of a sample made by knotting a carbon fiber bundle by the cross-sectional area of the fiber bundle (=mass per unit length/density), to be at least 298 N/mm$^2$. It is desired to more preferably be at least 400 N/mm$^2$, and particularly preferably at least 450 N/mm$^2$. The knot strength can be an index reflecting the mechanical performance of a fiber bundle other than in the fiber axial direction, and it is possible to simply evaluate the performance in a perpendicular direction to the fiber axis in particular. For the composite material, a material is often formed by pseudo-isotropic lamination to form a complex stress field. Upon doing so, stress in the fiber axis direction also generates in addition to tension and compressive stresses in the fiber axis direction. Furthermore, in the case of imparting relatively high speed strain like an impact test, the generated stress state inside the material is somewhat complex, and the strength in a different direction from the fiber axis direction is important. Therefore, with a knot strength less than 298 N/mm$^2$, sufficient mechanical performance is not realized in the pseudo-isotropic material.

In addition, the cross-sectional shape of a single fiber in the carbon fiber bundle of the present invention is not particularly limited, and may be any of a circular shape, elliptical shape and fava bean shape. Herein, the roundness is adopted as an index expressing the cross-sectional shape of a single fiber in the present invention. The roundness is a value obtained with Formula (2) below, in which S and L are respectively the cross-sectional area and perimeter of a single fiber obtained by SEM observation and image analysis of a cross section perpendicular to the fiber axis of a single fiber.

$$\text{Roundness}=4\pi S/L^2 \tag{2}$$

The roundness of a circle is 1.00, and this numerical value becomes smaller as the shape deviates from a circle. Therefore, the roundness of an elliptical shape and fava bean shape is smaller than 1.00 and, for example, in an elliptical shape, the numerical value becomes even smaller if the ratio between the major axis and minor axis thereof is larger. In addition, the cross-sectional shape of a single fiber in the precursor fiber bundle approximately matches the cross-sectional shape of a single fiber in the carbon fiber bundle; therefore, it can be considered as a shape derived from the precursor fiber. As a production process that greatly affects the cross-sectional shape determination of a single fiber, there is the coagulation process. In the case of the solvent concentration in the coagulation bath liquid being high, since the coagulation rate will be relatively slow, it is possible to obtain a precursor fiber bundle having high roundness and a compact structure. On the other hand, in the case of the solvent concentration of the coagulation bath temperature being low, since the coagulation rate will be relatively fast, a precursor fiber bundle having low roundness and a sparse structure will be obtained. Generally, in the case of the structure of the precursor fiber bundle being compact, a carbon fiber bundle of high strength tends to be obtained.

In the flameproofing process, in the case of the roundness being high, convergence as a precursor fiber bundle is high, and unevenness arises in the oxygen introduction amount between single fibers constituting as a bundle, and further, the heat generation will partially be stored accompanying the flameproofing reaction, and there is a tendency for portions reaching high temperatures locally to occur. In addition, in the respective single fibers, there is a strong tendency for the oxygen diffusion to the central part to be insufficient, and it is difficult for the flameproofing reaction to sufficiently progress. As a result thereof, single thread breakage and nap occurrence is frequent in the carbonization process, the processability is poor, and there is a tendency for a decline in strength and appearance of the obtained carbon fiber bundle to occur. Therefore, in the calcination of a precursor fiber bundle of high roundness, it is desirable to make a scheme such as lengthening the treatment time of the carbonizing process. From the viewpoint of performance expression of a composite material with resin, carbon fiber bundles with low roundness have large gaps between single fibers, a result of which the impregnation ability of resin can be made more superior. Therefore, compositing with resin is easy, and a composite material of higher performance can be obtained. On the other hand, since carbon fiber of high roundness has high rotation symmetry of shape, in comparison with carbon fiber having the same fineness, the lowest rigidity value of a cross-sectional two-dimensional moment is the largest, and the straightness as a single fiber is higher. As a result thereof, it comes to excel in strength expressability.

In the above way, there are positive aspects and negative aspects in the influence of cross-sectional shape on the ease of production, performance expressability and moldability of carbon fiber. Therefore, the cross-sectional shape of precursor fibers can be selected depending on the intended characteristics or performance of a composite material. The preferred cross-sectional shape of single fibers of a carbon fiber bundle has a roundness of at least 0.70 to no more than 0.99. If the roundness is at least 0.70, compactness of the precursor fiber bundle tends to be obtained, and there is a strong tendency for a high strength carbon fiber bundle to easily be obtained. If no more than 0.99, the oxygen diffusivity to the inside of the fiber bundle, and further, to the inside of a single fiber, tends to reach a sufficient level in the flameproofing process. A more preferable range for roundness is at least 0.79 to no more than 0.97.

EXAMPLES

Although the present invention will be explained in further detail by showing Examples in the following, the present invention is not to be limited in any way by these Examples, etc.

<Constant Velocity Temperature Rising Exothermic Curve of Precursor Fiber Bundle>

The constant velocity temperature rising exothermic curve of the precursor fiber bundle was measured as follows by way of a heat flux-type differential scanning calorimeter. First, the precursor fiber bundle was cut to a length of 4.0 mm, 4.0 mg was precisely weighed, loaded into a 50 µl-hermetically sealed sample container made of Ag manufactured by SII Inc. (trade name: P/N SSC000E030), and was covered by a mesh cover made of Cu manufactured by SII Inc. (trade name: P/N 50-037) (heat treated in air at 450° C. for 15 minutes). Next, it was measured from room temperature (30° C.) to 450° C. at conditions of heating rate of 10° C./min and air supply rate of 100 ml/min (standard of air supply rate: 30° C., 0.10 MPa) using a heat flux-type differential scanning calorimeter: DSC/220 (trade name) manufactured by SII Inc. The heat generation of 230° C. to 260° C. of the obtained constant velocity temperature rising exothermic curve was defined as heat amount Ja, and the heat generation of 260° C. to 290° C. was defined as heat amount Jb.

<Measurement of Knot Strength of Carbon Fiber Bundle>

The measurement of knot strength was implemented as follows. Gripping parts of 25 mm length were mounted to both ends of a 150-mm long carbon fiber bundle to make a test piece. Upon preparation of the test piece, doubling of carbon fiber bundles is performed by applying a load of $0.1 \times 10^{-3}$ N/denier. A knot was formed at substantially the center in this test piece, and a crosshead speed during pulling was implemented at 100 mm/min, and the maximum load value thereof was measured. Next, a value arrived at by dividing this maximum load value by the cross-sectional area of the carbon fiber bundle is defined as knot strength. The number of tests conducted was 12, the minimum and maximum values were discarded, and the average value of 10 was defined as the measured value of knot strength.

<Measurement of Strand Strength and Strand Modulus of Elasticity>

The strand strength and strand modulus of elasticity measured the tensile property of an epoxy resin impregnated strand based on the method of ASTM D4018.

<Roundness of Carbon Fiber Bundle>

(1) Preparation of Sample

A carbon fiber bundle cut to a length of 5 cm was embedded in epoxy resin (Epomount base resin: Epomount hardener=100:9 (mass ratio)), then cut to 2 cm to expose a cross section, and mirror surface processed.

(2) Etching Process of Observed Face

Furthermore, in order to make the profile of a fiber clear, the cross section of the sample was etching processed by the following method.

Apparatus Used: JEOL, JP-170 (trade name), plasma etching apparatus

Treatment conditions: (atmospheric gas: $Ar/O_2=75/25$ (volume ratio), plasma output: 50 W, vacuum: about 120 Pa, treatment time: 5 min)

(3) SEM Observation

The cross section of the sample obtained by (1) and (2) was observed using an SEM (PHILIPS FEI-XL20 (trade name)), and five photographs in which at least five fiber cross sections were captured on the screen were arbitrarily imaged.

Roundness Measurement of Single Fiber of Carbon Fiber Bundle

Using image analysis software (trade name: Image-Pro PLUS, produced by Nippon Roper K.K.), the profile of the fiber cross sections were traced, and the periphery L and surface area S were measured. Selecting 20 from five photographs arbitrarily, provided that at three fiber cross sections are from one photograph, each sample was measured, and the roundness was calculated according to the formula below:

$$\text{Roundness} = (4\pi S)/L^2$$

Example 1

An acrylonitrile-based copolymer consisting of acrylonitrile units/2-hydroxyethyl methacrylate units=98.5/1.5 (mol %) was obtained by copolymerizing under the presence of acrylonitrile, 2-hydroxyethyl methacrylate, ammonium persulfate-ammonium hydrogensulfite and ferric sulfate by way of aqueous suspension polymerization. This polyacrylonitrile-based copolymer was dissolved in dimethylacetoamide to prepare a 21% by mass spinning dope. Through a spinneret with 24,000 holes and a hole diameter of 60 μm (spinning nozzle), the spinning dope was discharged into a coagulation bath consisting of a dimethylacetoamide aqueous solution of 45% by mass concentration at a temperature of 35° C., and received at a rate 0.32 times the discharge linear velocity from the spinneret to obtain a fiber bundle (swollen line of thread). Next, this fiber bundle was drawn to 5.4 times simultaneously with water rinsing, was led to a first oil bath tank consisting of an oil-based treatment liquid in which an oil-based composition of amino-modified silicone/polyoxyethylene(6)lauryl ether=91/9 (mass ratio) had been dispersed in water at a concentration of 1.5% by mass, the oil-based treatment liquid was imparted to the fiber bundle, and after temporarily wringing out with a guide, it was successively led to a second oil bath tank consisting of the same composition and concentration as the first oil bath tank to impart the oil-based treatment liquid to the fiber bundle again. The fiber bundle imparted with the oil-based treatment liquid again was dried using a heated roller, and dry drawing at 1.34 times was done between heated rollers for which the rotational speed was adjusted to predetermined conditions. The overall draw ratio from the swollen line of thread at this time was 7.4 times. Subsequently, the moisture percentage was adjusted by imparting water to the fiber bundle with a touch roller to obtain a precursor fiber bundle with a single fiber fineness of 2.5 dtex.

The above-mentioned precursor fiber bundle was subjected to flameproofing treatment under a temperature distribution of 220 to 260° C. for 70 minutes at an elongation rate of 5.0% to obtain a flameproof fiber bundle with a density of 1.35 g/cm$^3$. The obtained flameproof fiber bundle was further pre-carbonization treated for 1.1 minutes under a nitrogen atmosphere at 700° C. with an elongation rate of 3%, then carbonization treated for 1.0 minute in a nitrogen atmosphere at 1,300° C. with an elongation rate of –4.0% to obtain a carbon fiber bundle. Subsequently, surface treatment was performed on the carbon fiber bundle by way of an electrolytic oxidation method, and thereafter a sizing agent was imparted. The sizing agent used was an aqueous dispersion prepared by mixing 80 parts by mass of "Epikote 828 (trade name)" manufactured by Japan Epoxy Resin Co., Ltd. as a base compound, and 20 parts by mass of "Pluronic F88 (trade name)" manufactured by ADEKA Corp. as an emulsifier, and phase-transfer emulsifying. This sizing agent was adhered at 1% by mass relative to the carbon fiber bundle, and after passing through the drying process, a carbon fiber bundle was obtained. Upon measuring the strand properties of the obtained carbon fiber bundle, the strand strength was 4.4 Gpa and the strand modulus of elasticity was 233 GPa. In addition, the single fiber fineness of the carbon fiber was 1.27 dtex, the roundness was 0.82, and the knot strength was 417 N/mm$^2$. Furthermore, the heat amount Ja obtained by heat flux-type differential scanning calorimetry measurement was 170 kJ/kg, and the heat amount Jb was 725 kJ/kg.

Example 2

A carbon fiber bundle was obtained similarly to Example 1, except for copolymerizing under the presence of acrylonitrile, 2-hydroxyethyl methacrylate, ammonium persulfate-ammonium hydrogensulfite and ferric sulfate by way of aqueous suspension polymerization, and setting to acrylonitrile units/2-hydroxyethyl methacrylate units=98.0/2.0 (mol %). Upon measuring the strand properties of the obtained carbon fiber bundle, the strand strength was 4.3 GPa and the strand modulus of elasticity was 233 GPa. In addition, the single fiber fineness of the carbon fiber was 1.26 dtex, the roundness was 0.82, and the knot strength was 410 N/mm$^2$. Furthermore, the heat amount Ja obtained by heat flux-type differential scanning calorimetry measurement was 168 kJ/kg, and the heat amount Jb was 722 kJ/kg.

Example 3

A carbon fiber bundle was obtained similarly to Example 2, except for setting the coagulation bath concentration of 45% by mass (concentration of dimethylacetoamide) and a coagulation bath temperature of 25° C. Upon measuring the strand properties of the obtained carbon fiber bundle, the strand strength was 4.2 GPa and the strand modulus of elasticity was 232 GPa. In addition, the single fiber fineness of the carbon fiber was 1.27 dtex, the roundness was 0.79, and the knot strength was 420 N/mm$^2$. Furthermore, the heat amount Ja obtained by heat flux-type differential scanning calorimetry measurement was 175 kJ/kg, and the heat amount Jb was 740 kJ/kg.

Example 4

A carbon fiber bundle was obtained similarly to Example 2, except for setting the coagulation bath concentration of 50% by mass and a coagulation bath temperature of 35° C. Upon measuring the strand properties of the obtained carbon fiber bundle, the strand strength was 4.3 GPa and the strand modulus of elasticity was 232 GPa. In addition, the single fiber fineness of the carbon fiber was 1.27 dtex, the roundness was 0.86, and the knot strength was 420 N/mm$^2$. Furthermore, the heat amount Ja obtained by heat flux-type differential scanning calorimetry measurement was 170 kJ/kg, and the heat amount Jb was 725 kJ/kg.

Example 5

A carbon fiber bundle was obtained similarly to Example 2, except for setting the coagulation bath concentration of 50% by mass and a coagulation bath temperature of 40° C. Upon measuring the strand properties of the obtained carbon fiber bundle, the strand strength was 4.2 GPa and the strand modulus of elasticity was 233 GPa. In addition, the single fiber fineness of the carbon fiber was 1.26 dtex, the roundness was 0.88, and the knot strength was 422 N/mm$^2$. Furthermore, the heat amount Ja obtained by heat flux-type differential scanning calorimetry measurement was 172 kJ/kg, and the heat amount Jb was 727 kJ/kg.

Example 6

A carbon fiber bundle was obtained similarly to Example 1, except for setting the coagulation bath concentration of 60% by mass and a coagulation bath temperature of 45° C. Upon measuring the strand properties of the obtained carbon fiber bundle, the strand strength was 4.2 GPa and the strand modulus of elasticity was 233 GPa. In addition, the single fiber fineness of the carbon fiber was 1.27 dtex, the roundness was 0.93, and the knot strength was 450 N/mm$^2$. Furthermore, the heat amount Ja obtained by heat flux-type differential scanning calorimetry measurement was 168 kJ/kg, and the heat amount Jb was 722 kJ/kg.

Example 7

A carbon fiber bundle was obtained similarly to Example 1, except for setting the coagulation bath concentration of 67% by mass and a coagulation bath temperature of 35° C. Upon measuring the strand properties of the obtained carbon fiber bundle, the strand strength was 4.2 GPa and the strand modulus of elasticity was 233 GPa. In addition, the single fiber fineness of the carbon fiber was 1.26 dtex, the roundness was 0.95, and the knot strength was 490 N/mm$^2$. Furthermore, the heat amount Ja obtained by heat flux-type differential scanning calorimetry measurement was 163 kJ/kg, and the heat amount Jb was 710 kJ/kg.

Example 8

A carbon fiber bundle was obtained similarly to Example 1, except for copolymerizing under the presence of acrylonitrile, 2-hydroxyethyl methacrylate, ammonium persulfate-ammonium hydrogensulfite and ferric sulfate by way of aqueous suspension polymerization, and setting to acrylonitrile units/2-hydroxyethyl methacrylate units=97.5/2.5 (mol %), the coagulation bath concentration of 67% by mass and coagulation bath temperature of 45° C. Upon measuring the strand properties of the obtained carbon fiber bundle, the strand strength was 4.2 GPa and the strand modulus of elasticity was 233 GPa. In addition, the single fiber fineness of the carbon fiber was 1.26 dtex, the roundness was 0.98, and the knot strength was 510 N/mm$^2$. Furthermore, the heat amount Ja obtained by heat flux-type differential scanning calorimetry measurement was 159 kJ/kg, and the heat amount Jb was 698 kJ/kg.

Example 9

A precursor fiber bundle was obtained by the same method as Example 1 except for obtaining a fiber bundle (swollen line of thread) by discharging the spinning dope into a coagulation bath consisting of dimethylacetoamide aqueous solution of 45% by mass concentration at a temperature of 35° C., through a spinneret with 36,000 holes and a hole diameter of 60 μm (spinning nozzle), and receiving at a rate 0.45 times the discharge linear velocity from the spinneret. Carbon fiber was produced by the same method as Example 1 except for setting the flameproofing elongation rate to −4%. Upon measuring the strand properties of the obtained carbon fiber bundle, the strand strength was 4.8 GPa and the strand modulus of elasticity was 235 GPa. In addition, the single fiber fineness of the carbon fiber was 1.04 dtex, the roundness was 0.82, and the knot strength was 480 N/mm$^2$. Furthermore, the heat amount Ja obtained by heat flux-type differential scanning calorimetry measurement was 190 kJ/kg, and the heat amount Jb was 745 kJ/kg.

Example 10

A precursor fiber bundle was obtained by the same method as Example 1 except for obtaining a fiber bundle (swollen line of thread) by discharging the spinning dope into a coagulation bath consisting of dimethylacetoamide aqueous solution of 45% by mass concentration at a temperature of 35° C., through a spinneret with 24,000 holes and a hole diameter of 60 μm (spinning nozzle), and receiving at a rate 0.40 times the discharge linear velocity from the spinneret. Carbon fiber was produced by the same method as Example 1 except for setting the flameproofing elongation rate to −2.0%. Upon measuring the strand properties of the obtained carbon fiber bundle, the strand strength was 4.7 GPa and the strand modulus of elasticity was 235 GPa. In addition, the single fiber fineness of the carbon fiber was 0.95 dtex, the roundness was 0.82, and the knot strength was 460 N/mm$^2$. Furthermore, the heat amount Ja obtained by heat flux-type differential scanning calorimetry measurement was 185 kJ/kg, and the heat amount Jb was 740 kJ/kg.

Example 11

The spinning dope was discharged into a coagulation bath consisting of a dimethylacetamide aqueous solution of 45% by mass concentration at a temperature of 35° C., and received at a rate 0.35 times the discharge linear velocity of the spinning dope to obtain a fiber bundle (swollen line of thread). Next, this fiber bundle was drawn to 5.3 times simultaneously with water rinsing, was led to a first oil bath tank consisting of an oil-based treatment liquid in which an oil-based composition of amino-modified silicone/polyoxyethylene(6)lauryl ether=91/9 (mass ratio) had been dispersed in water at a concentration of 1.5% by mass, the oil-based treatment liquid was imparted to the fiber bundle, and after temporarily wringing out with a guide, it was successively led to a second oil bath tank consisting of the same composition and concentration as the first oil bath tank to impart the oil-based treatment liquid to the fiber bundle again. This fiber bundle was dried using a heated roller, and dry drawing at 1.7 times was done between heated rollers for which the rotational speed was adjusted to predetermined conditions. The overall draw ratio from the swollen line of thread at this time was 9.0 times. A precursor fiber bundle with a single fiber fineness of 2.3 dtex was obtained by the same method as Example 1 except for this.

Carbon fiber was produced by the same method as Example 1 except for setting the flameproofing elongation rate of 1.0% for the above-mentioned precursor fiber bundle. Upon measuring the strand properties of the obtained carbon fiber bundle, the strand strength was 5.0 GPa and the strand modulus of elasticity was 235 GPa. In addition, the single fiber fineness of the carbon fiber was 1.12 dtex, the roundness was 0.85, and the knot strength was 490 N/mm$^2$. Furthermore, the heat amount Ja obtained by heat flux-type differential scanning calorimetry measurement was 175 kJ/kg, and the heat amount Jb was 730 kJ/kg.

Example 12

A precursor fiber bundle with a single fiber fineness of 3.5 dtex was obtained similarly to Example 1 except for obtaining a fiber bundle (swollen line of thread) by discharging the spinning dope into a coagulation bath consisting of dimethylacetoamide aqueous solution of 45% by mass concentration at a temperature of 35° C., through a spinneret with 15,000 holes and a hole diameter of 60 μm (spinning nozzle), and receiving at a rate 0.23 times the discharge linear velocity from the spinneret.

The above-mentioned precursor fiber bundle was subjected to flameproofing treatment under a temperature distribution of 220 to 260° C. for 120 minutes at an elongation rate of 5% to obtain a flameproof fiber bundle. The obtained flameproof fiber bundle was further pre-carbonization treated for 1.2 minutes under a nitrogen atmosphere at 700° C. with an elongation rate of 3.0%, then carbonization treated for 1.2 minutes in a nitrogen atmosphere at 1,350° C. with an elongation rate of −4.0%. A carbon fiber bundle was obtained similarly to Example 1 except for these. Upon measuring the strand properties of the obtained carbon fiber bundle, the strand strength was 4.0 GPa and the strand modulus of elasticity was 235 GPa. In addition, the single fiber fineness of the carbon fiber was 1.69 dtex, the roundness was 0.84, and the knot strength was 360 N/mm$^2$. Furthermore, the heat amount Ja obtained by heat flux-type differential scanning calorimetry measurement was 150 kJ/kg, and the heat amount Jb was 690 kJ/kg.

Example 13

A precursor fiber bundle with a single fiber fineness of 4.5 dtex was obtained similarly to Example 1 except for discharging the spinning dope into a coagulation bath consisting of dimethylacetoamide aqueous solution of 45% by mass concentration at a temperature of 35° C., through a spinneret with 12,000 holes and a hole diameter of 60 μm (spinning nozzle), and receiving at a rate 0.18 times the discharge linear velocity from the spinneret.

The above-mentioned precursor fiber bundle was subjected to flameproofing treatment under a temperature distribution of 220 to 260° C. for 150 minutes at an elongation rate of 5% to obtain a flameproof fiber bundle. The obtained flameproof fiber bundle was further pre-carbonization treated for 1.8 minutes under a nitrogen atmosphere at 700° C. with an elongation rate of 3.0%, then carbonization treated for 1.6 minutes in a nitrogen atmosphere at 1,300° C. with an elongation rate of −4.0%. A carbon fiber bundle was obtained similarly to Example 1 except for these. Upon measuring the strand properties of the obtained carbon fiber bundle, the strand strength was 3.0 GPa and the strand modulus of elasticity was 230 GPa. In addition, the single fiber fineness of the carbon fiber was 2.43 dtex, the roundness was 0.83, and the knot strength was 345 N/mm$^2$. Furthermore, the heat amount Ja obtained by heat flux-type differential scanning calorimetry measurement was 135 kJ/kg, and the heat amount Jb was 660 kJ/kg.

Example 14

Carbon fiber was produced by the same method as Example 1 except for setting a flameproofing treatment time of 50 minutes. Upon measuring the strand properties of the obtained carbon fiber bundle, the strand strength was 4.0 GPa and the strand modulus of elasticity was 235 GPa. In addition, the single fiber fineness of the carbon fiber was 1.27 dtex, the roundness was 0.82, and the knot strength was 390 N/mm$^2$. Furthermore, the heat amount Ja obtained by heat flux-type differential scanning calorimetry measurement was 170 kJ/kg, and the heat amount Jb was 725 kJ/kg.

Example 15

Carbon fiber was produced by the same method as Example 1 except for setting a flameproofing treatment time of 120 minutes. Upon measuring the strand properties of the obtained carbon fiber bundle, the strand strength was 5.2 GPa and the strand modulus of elasticity was 235 GPa. In addition, the single fiber fineness of the carbon fiber was 1.27 dtex, the roundness was 0.82, and the knot strength was 480 N/mm$^2$. Furthermore, the heat amount Ja obtained by heat flux-type differential scanning calorimetry measurement was 170 kJ/kg, and the heat amount Jb was 725 kJ/kg.

Example 16

Carbon fiber was produced by the same method as Example 1 except for setting a flameproofing treatment time of 150 minutes. Upon measuring the strand properties of the obtained carbon fiber bundle, the strand strength was 5.2 GPa and the strand modulus of elasticity was 235 GPa. In addition, the single fiber fineness of the carbon fiber was 1.27 dtex, the roundness was 0.82, and the knot strength was 500 N/mm$^2$. Furthermore, the heat amount Ja obtained by heat flux-type differential scanning calorimetry measurement was 170 kJ/kg, and the heat amount Jb was 725 kJ/kg.

Example 17

A carbon fiber bundle was obtained similarly to Example 1 except for obtaining a fiber bundle (swollen line of thread) by discharging the spinning dope into a coagulation bath consisting of dimethylacetoamide aqueous solution of 45% by mass concentration at a temperature of 35° C., through a spinneret with 40,000 holes and a hole diameter of 60 μm (spinning nozzle), and receiving at a rate 0.32 times the discharge linear velocity from the spinneret. Upon measuring the strand properties of the obtained carbon fiber bundle, the strand strength was 3.9 GPa and the strand modulus of elasticity was 225 GPa. In addition, the single fiber fineness of the carbon fiber was 1.27 dtex, the roundness was 0.82, and the knot strength was 298 N/mm$^2$. Furthermore, the heat amount Ja obtained by heat flux-type differential scanning calorimetry measurement was 170 kJ/kg, and the heat amount Jb was 725 kJ/kg.

Example 18

A carbon fiber bundle was obtained similarly to Example 1, except for copolymerizing under the presence of acrylonitrile, 2-hydroxyethyl acrylate, ammonium persulfate-ammonium hydrogensulfite and ferric sulfate by way of aqueous suspension polymerization, and setting to acrylonitrile units/2-hydroxyethyl acrylate units=98.5/1.5 (mol %). Upon measuring the strand properties of the obtained carbon fiber bundle, the strand strength was 4.2 GPa and the strand modulus of elasticity was 233 GPa. In addition, the single fiber fineness of the carbon fiber was 1.26 dtex, the roundness was 0.85, and the knot strength was 415 N/mm$^2$. Furthermore, the heat amount Ja obtained by heat flux-type differential scanning calorimetry measurement was 198 kJ/kg, and the heat amount Jb was 850 kJ/kg.

Comparative Example 1

An acrylonitrile-based copolymer consisting of acrylonitrile units/acrylamide units/methacrylate units=96/3/1 (mol %) was obtained by copolymerizing acrylonitrile, acrylamide and methacrylic acid under the presence of ammonium persulfate-ammonium hydrogensulfite and ferric sulfate by way of aqueous suspension polymerization. This polyacrylonitrile-based copolymer was dissolved in dimethylacetoamide to prepare a 21% by mass spinning dope. Through a spinneret with 24,000 holes and a hole diameter of 60 μm (spinning nozzle), the spinning dope was discharged into a coagulation bath consisting of a dimethylacetoamide aqueous solution of 60% by mass concentration at a temperature of 35° C., and received at a rate 0.32 times the discharge linear velocity from the spinneret to obtain a fiber bundle (swollen line of thread). Next, this fiber bundle was drawn to 5.4 times simultaneously with water rinsing, was led to a first oil bath tank consisting of an oil-based treatment liquid in which an oil-based composition of amino-modified silicone/polyoxyethylene(6)lauryl ether=91/9 (mass ratio) had been dispersed in water at a concentration of 1.5% by mass, the oil-based treatment liquid was imparted to the fiber bundle, and after temporarily wringing out with a guide, it was successively led to a second oil bath tank consisting of the same composition and concentration as the first oil bath tank to impart the oil-based treatment liquid to the fiber bundle again. The fiber bundle imparted with the oil-based treatment liquid again was dried using a heated roller, and dry drawing at 1.3 times was done between heated rollers for which the rotational speed was adjusted to predetermined conditions. The overall draw ratio from the swollen line of thread at this time was 7.3 times. Subsequently, the moisture percentage was adjusted by imparting water to the fiber bundle with a touch roller to obtain a precursor fiber bundle with a single fiber fineness of 2.5 dtex.

The above-mentioned precursor fiber bundle was subjected to flameproofing treatment under a temperature distribution of 220 to 260° C. for 180 minutes at an elongation rate of 2.0% to obtain a flameproof fiber bundle. The obtained flameproof fiber bundle was further pre-carbonization treated for 2.2 minutes under a nitrogen atmosphere at 700° C. with an elongation rate of 3.0%, then carbonization treated for 2.0 minutes in a nitrogen atmosphere at 1,300° C. with an elongation rate of −4.0%. A carbon fiber bundle was obtained similarly to Example 1 except for these. Upon measuring the strand properties of the obtained carbon fiber bundle, the strand strength was 3.8 Gpa and the strand modulus of elasticity was 231 GPa. In addition, the single fiber fineness of the carbon fiber was 1.37 dtex, the roundness was 0.85, and the knot strength was 297 N/mm$^2$. Furthermore, the heat amount Ja obtained by heat flux-type differential scanning calorimetry measurement was 190 kJ/kg, and the heat amount Jb was 1151 kJ/kg.

Comparative Example 2

Carbon fiber was produced by the same method as Comparative Example 1 except for setting the flameproofing treatment time to 120 minutes and the flameproofing elongation ratio to 5.0%. Upon measuring the strand properties of the obtained carbon fiber bundle, the strand strength was 3.2 GPa and the strand modulus of elasticity was 230 GPa. In addition, the single fiber fineness of the carbon fiber was 1.37 dtex, the roundness was 0.85, and the knot strength was 275 N/mm$^2$. Furthermore, the heat amount Ja obtained by heat flux-type differential scanning calorimetry measurement was 190 kJ/kg, and the heat amount Jb was 1151 kJ/kg.

Comparative Example 3

Carbon fiber was produced by the same method as Comparative Example 1 except for setting the flameproofing treatment time to 60 minutes and the flameproofing elongation ratio to 5.0%. Upon measuring the strand properties of the obtained carbon fiber bundle, the strand strength was 3.0 GPa and the strand modulus of elasticity was 225 GPa. In addition, the single fiber fineness of the carbon fiber was 1.40 dtex, the roundness was 0.85, and the knot strength was 259 N/mm$^2$. Furthermore, the heat amount Ja obtained by heat flux-type differential scanning calorimetry measurement was 190 kJ/kg, and the heat amount Jb was 1151 kJ/kg.

Comparative Example 4

Carbon fiber was produced by the same method as Example 1 except for setting the flameproofing treatment time to 30 minutes. Upon measuring the strand properties of the obtained carbon fiber bundle, the strand strength was 3.0 GPa and the strand modulus of elasticity was 235 GPa. In addition, the single fiber fineness of the carbon fiber was 1.27 dtex, the roundness was 0.82, and the knot strength was 290 N/mm$^2$. Furthermore, the heat amount Ja obtained by heat flux-type differential scanning calorimetry measurement was 170 kJ/kg, and the heat amount Jb was 725 kJ/kg.

Comparative Example 5

Copolymerization was performed under the presence of acrylonitrile, 2-hydroxyethyl methacrylate, ammonium-persulfate-ammonium hydrogensulfite and ferric sulfate by way of aqueous suspension polymerization, establishing acrylonitrile units/2-hydroxyethyl methacrylate units=95/5 (mol %). Otherwise, a carbon fiber bundle was produced similarly to Example 1. Upon measuring the strand properties of the obtained carbon fiber bundle, the strand strength was 3.0 GPa and the strand modulus of elasticity was 229 GPa. In addition, the single fiber fineness of the carbon fiber was 1.21 dtex, the roundness was 0.85, and the knot strength was 275 N/mm$^2$. Furthermore, the heat amount Ja obtained by heat flux-type differential scanning calorimetry measurement was 139 kJ/kg, and the heat amount Jb was 650 kJ/kg.

Comparative Example 6

A precursor fiber bundle with a single fiber fineness of 5.5 dtex was obtained similarly to Example 1 except for discharging the spinning dope into a coagulation bath consisting of a dimethylacetoamide aqueous solution of 45% by mass concentration at a temperature of 35° C., through a spinneret with 12,000 holes and a hole diameter of 60 μm (spinning nozzle), and receiving at a rate 0.15 times the discharge linear velocity from the spinneret.

The above-mentioned precursor fiber bundle was subjected to flameproofing treatment under a temperature distribution of 220 to 260° C. for 150 minutes at an elongation rate of 5.0% to obtain a flameproof fiber bundle. The obtained flameproof fiber bundle was further pre-carbonization treated for 1.8 minutes under a nitrogen atmosphere at 700° C. with an elongation rate of 3.0%, then carbonization treated for 1.6 minutes in a nitrogen atmosphere at 1,300° C.

with an elongation rate of −4.0%. A carbon fiber bundle was obtained similarly to Example 1 except for these. Upon measuring the strand properties of the obtained carbon fiber bundle, the strand strength was 2.5 GPa and the strand modulus of elasticity was 225 GPa. In addition, the single fiber fineness of the carbon fiber was 2.78 dtex, the roundness was 0.82, and the knot strength was 250 N/mm². Furthermore, the heat amount Ja obtained by heat flux-type differential scanning calorimetry measurement was 130 kJ/kg, and the heat amount Jb was 650 kJ/kg.

Reference Example 1

Carbon fiber was produced by the same method as Example 1 except for setting the flameproofing treatment time to 180 minutes. Upon measuring the strand properties of the obtained carbon fiber bundle, the strand strength was 5.3 GPa and the strand modulus of elasticity was 238 GPa. In addition, the single fiber fineness of the carbon fiber was 1.27 dtex, the roundness was 0.82, and the knot strength was 510 N/mm². Furthermore, the heat amount Ja obtained by heat flux-type differential scanning calorimetry measurement was 170 kJ/kg, and the heat amount Jb was 725 kJ/kg.

Although the knot strength can be raised when lengthening the flameproofing time, since the flameproofing time lengthens, the productivity declines compared to the Examples.

The test conditions of the Examples and Comparative Examples and the properties of the obtained carbon fiber bundles are shown in Tables 3 and 4.

TABLE 3

|  | Example 1 | Example 2 | Example 3 | Example 4 | Example 5 | Example 6 | Example 7 | Example 8 | Example 9 |
|---|---|---|---|---|---|---|---|---|---|
| Precursor fiber fineness (dtex) | 2.5 | 2.5 | 2.5 | 2.5 | 2.5 | 2.5 | 2.5 | 2.5 | 1.8 |
| Thread number of precursor fiber bundles | 24,000 | 24,000 | 24,000 | 24,000 | 24,000 | 24,000 | 24,000 | 24,000 | 36,000 |
| Acrylonitrile (mol %) | 98.5 | 98.0 | 98 | 98 | 98 | 98.5 | 98.5 | 97.5 | 98.5 |
| 2-hydroxyethyl methacrylate (mol %) | 1.5 | 2.0 | 2.0 | 2.0 | 2.0 | 1.5 | 1.5 | 2.5 | 1.5 |
| 2-hydroxyethyl acrylate (mol %) | — | — | — | — | — | — | — | — | — |
| Acrylamide (mol %) | — | — | — | — | — | — | — | — | — |
| Methacrylic acid (mol %) | — | — | — | — | — | — | — | — | — |
| Coagulation bath concentration (Mass %) | 45 | 45 | 45 | 50 | 50 | 60 | 67 | 67 | 45 |
| Coagulation bath temperature (° C.) | 35 | 35 | 25 | 35 | 40 | 45 | 35 | 45 | 35 |
| Flameproofing time (min) | 70 | 70 | 70 | 70 | 70 | 70 | 70 | 70 | 70 |
| Flameproofing elongation rate (%) | 5.0 | 5.0 | 5.0 | 5.0 | 5.0 | 5.0 | 5.0 | 5.0 | −4.0 |
| Area weight of carbon fiber bundle (g/m) | 3.04 | 3.03 | 3.04 | 3.04 | 3.03 | 3.04 | 3.03 | 3.02 | 3.73 |
| Density of carbon fiber bundle (g/cm³) | 1.81 | 1.81 | 1.81 | 1.81 | 1.81 | 1.81 | 1.81 | 1.81 | 1.81 |
| Circularity | 0.82 | 0.82 | 0.79 | 0.86 | 0.88 | 0.93 | 0.95 | 0.98 | 0.82 |
| Carbon fiber single fiber fineness (dtex) | 1.27 | 1.26 | 1.27 | 1.27 | 1.26 | 1.27 | 1.26 | 1.26 | 1.04 |
| Knot strength (N/mm²) | 417 | 410 | 420 | 420 | 422 | 450 | 490 | 510 | 480 |
| Strand strength (GPa) | 4.4 | 4.3 | 4.2 | 4.3 | 4.2 | 4.2 | 4.2 | 4.2 | 4.8 |
| Strand module of elasticity (GPa) | 233 | 233 | 232 | 232 | 233 | 233 | 233 | 233 | 235 |
| Heat flux-type differential scanning calorimeter Ja (kJ/kg) | 170 | 168 | 175 | 170 | 172 | 168 | 163 | 159 | 190 |
| Heat flux-type differential scanning calorimeter Jb (kJ/kg) | 725 | 722 | 740 | 725 | 727 | 722 | 710 | 698 | 745 |

|  | Example 10 | Example 11 | Example 12 | Example 13 | Example 14 | Example 15 | Example 16 | Example 17 | Example 18 |
|---|---|---|---|---|---|---|---|---|---|
| Precursor fiber fineness (dtex) | 2.0 | 2.3 | 3.5 | 4.5 | 2.5 | 2.5 | 2.5 | 2.5 | 2.5 |
| Thread number of precursor fiber bundles | 24,000 | 24,000 | 15,000 | 12,000 | 24,000 | 24,000 | 24,000 | 40,000 | 24,000 |
| Acrylonitrile (mol %) | 98.5 | 98.5 | 98.5 | 98.5 | 98.5 | 98.5 | 98.5 | 98.5 | 98.5 |
| 2-hydroxyethyl methacrylate (mol %) | 1.5 | 1.5 | 1.5 | 1.5 | 1.5 | 1.5 | 1.5 | 1.5 | — |
| 2-hydroxyethyl acrylate (mol %) | — | — | — | — | — | — | — | — | 1.5 |
| Acrylamide (mol %) | — | — | — | — | — | — | — | — | — |
| Methacrylic acid (mol %) | — | — | — | — | — | — | — | — | — |
| Coagulation bath concentration (Mass %) | 45 | 45 | 45 | 45 | 45 | 45 | 45 | 45 | 45 |
| Coagulation bath temperature (° C.) | 35 | 35 | 35 | 35 | 35 | 35 | 35 | 35 | 35 |
| Flameproofing time (min) | 70 | 70 | 120 | 150 | 50 | 120 | 150 | 70 | 70 |
| Flameproofing elongation rate (%) | −2.0 | 1.0 | 5.0 | 5.0 | 5.0 | 5.0 | 5.0 | 5.0 | 5.0 |

TABLE 3-continued

| | | | | | | | | | |
|---|---|---|---|---|---|---|---|---|---|
| Area weight of carbon fiber bundle (g/m) | 2.27 | 2.68 | 2.54 | 2.91 | 3.05 | 3.05 | 3.05 | 5.07 | 3.03 |
| Density of carbon fiber bundle (g/cm$^3$) | 1.81 | 1.81 | 1.81 | 1.82 | 1.81 | 1.81 | 1.81 | 1.81 | 1.81 |
| Circularity | 0.82 | 0.85 | 0.84 | 0.83 | 0.82 | 0.82 | 0.82 | 0.82 | 0.85 |
| Carbon fiber single fiber fineness (dtex) | 0.95 | 1.12 | 1.69 | 2.43 | 1.27 | 1.27 | 1.27 | 1.27 | 1.26 |
| Knot strength (N/mm$^2$) | 460 | 490 | 360 | 345 | 390 | 480 | 500 | 298 | 415 |
| Strand strength (GPa) | 4.7 | 5.0 | 4.0 | 3.0 | 4.0 | 5.2 | 5.2 | 3.9 | 4.2 |
| Strand module of elasticity (GPa) | 235 | 235 | 235 | 230 | 235 | 235 | 235 | 225 | 233 |
| Heat flux-type differential scanning calorimeter Ja (kJ/kg) | 185 | 175 | 150 | 135 | 170 | 170 | 170 | 170 | 198 |
| Heat flux-type differential scanning calorimeter Jb (kJ/kg) | 740 | 730 | 690 | 660 | 725 | 725 | 725 | 725 | 850 |

TABLE 4

| | Comparative Example | Comparative Example 2 | Comparative Example 3 | Comparative Example 4 | Comparative Example 5 | Comparative Example 6 | Reference Example 1 |
|---|---|---|---|---|---|---|---|
| Precursor fiber fineness (dtex) | 2.5 | 2.5 | 2.5 | 2.5 | 2.5 | 5.5 | 2.5 |
| Thread number of precursor fiber bundles | 24,000 | 24,000 | 24,000 | 24,000 | 24,000 | 12,000 | 24,000 |
| Acrylonitrile (mol %) | 96.0 | 96.0 | 96.0 | 98.5 | 95.0 | 98.5 | 98.5 |
| 2-hydroxyethyl methacrylate (mol %) | — | — | — | 1.5 | 5.0 | 1.5 | 1.5 |
| Acrylamide (mol %) | 3.0 | 3.0 | 3.0 | — | — | — | — |
| Methacrylic acid (mol %) | 1.0 | 1.0 | 1.0 | — | — | — | — |
| Coagulation bath concentration (Mass %) | 60 | 60 | 60 | 45 | 45 | 45 | 45 |
| Coagulation bath temperature (° C.) | 35 | 35 | 35 | 35 | 35 | 35 | 35 |
| Flameproofing time (min) | 180 | 120 | 60 | 30 | 70 | 150 | 180 |
| Flameproofing elongation rate (%) | 2.0 | 5.0 | 5.0 | 5.0 | 5.0 | 5.0 | 5.0 |
| Areal weight of carbon fiber bundle (g/m) | 3.29 | 3.29 | 3.35 | 3.05 | 2.9 | 3.34 | 3.05 |
| Density of carbon fiber bundle (g/cm$^3$) | 1.82 | 1.82 | 1.82 | 1.81 | 1.81 | 1.81 | 1.81 |
| Circularity | 0.85 | 0.85 | 0.85 | 0.82 | 0.85 | 0.82 | 0.82 |
| Carbon fiber single fiber fineness (dtex) | 1.37 | 1.37 | 1.40 | 1.27 | 1.21 | 2.78 | 1.27 |
| Knot strength (N/mm$^2$) | 297 | 275 | 259 | 290 | 275 | 250 | 510 |
| Strand strength (GPa) | 3.8 | 3.2 | 3.0 | 3.0 | 3.0 | 2.5 | 5.3 |
| Strand module of elasticity (GPa) | 231 | 230 | 225 | 235 | 229 | 225 | 238 |
| Heat flux-type differential scanning calorimeter Ja (kJ/kg) | 190 | 190 | 190 | 170 | 139 | 130 | 170 |
| Heat flux-type differential scanning calorimeter Jb (kJ/kg) | 1151 | 1151 | 1151 | 725 | 650 | 650 | 725 |

The invention claimed is:

1. A carbon fiber bundle having a single fiber fineness of at least 0.8 dtex to no more than 2.5 dtex, and a knot strength of at least 298 N/mm$^2$,
   wherein the carbon fiber bundle is prepared by a heat treatment of a polyacrylonitrile-based precursor fiber bundle having a single fiber fineness of at least 1.7 dtex to no more than 5.0 dtex,
   wherein the polyacrylonitrile-based precursor fiber bundle consists of a polyacrylonitrile-based copolymer and a copolymer comprising 1 to 4.0 mole % of hydroxyalkyl methacrylate units.

2. The carbon fiber bundle according to claim 1, wherein the polyacrylonitrile-based precursor fiber bundle consists of a polyacrylonitrile-based copolymer and a copolymer comprising 1.2 to 4.0 mole % of hydroxyalkyl methacrylate units.

3. The carbon fiber bundle according to claim 1, wherein the polyacrylonitrile-based precursor fiber bundle consists of a polyacrylonitrile-based copolymer and a copolymer comprising 1.5 to 4.0 mole % of hydroxyalkyl methacrylate units.

4. The carbon fiber bundle according to claim 1, wherein the polyacrylonitrile-based precursor fiber bundle consists of a polyacrylonitrile-based copolymer and a copolymer comprising 1.5 to 3.0 mole % of hydroxyalkyl methacrylate units.

* * * * *